Dec. 22, 1925.  
E. H. GOLD ET AL  
1,566,853  
THERMOSTAT FOR CAR HEATING SYSTEMS  
Filed July 27, 1923  2 Sheets-Sheet 1
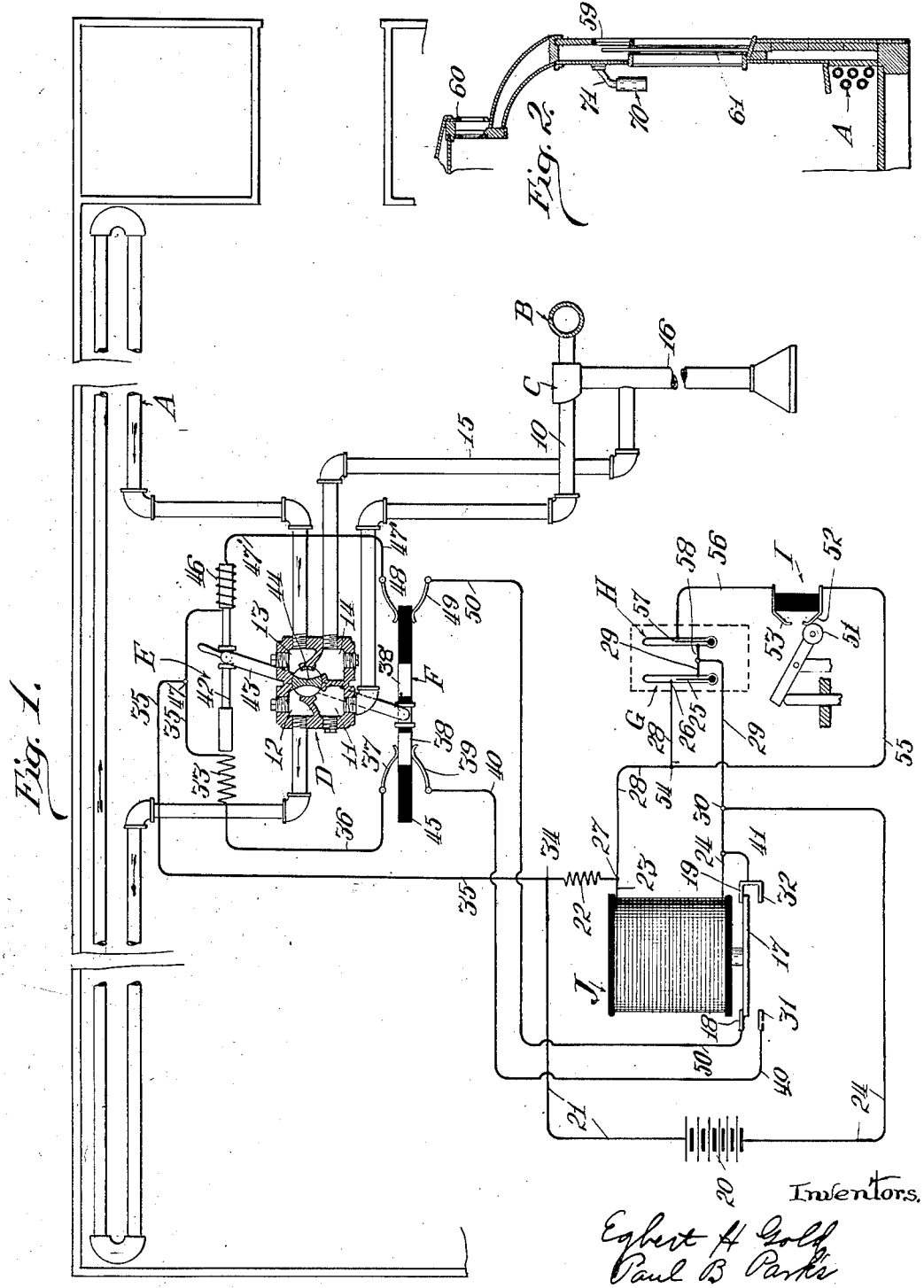
Inventors.  
Egbert H. Gold  
Paul B. Parks  
By Barrett Truman  
Attorneys Dec. 22, 1925.
E. H. GOLD ET AL
1,566,853
THERMOSTAT FOR CAR HEATING SYSTEMS
Filed July 27, 1923    2 Sheets-Sheet 2
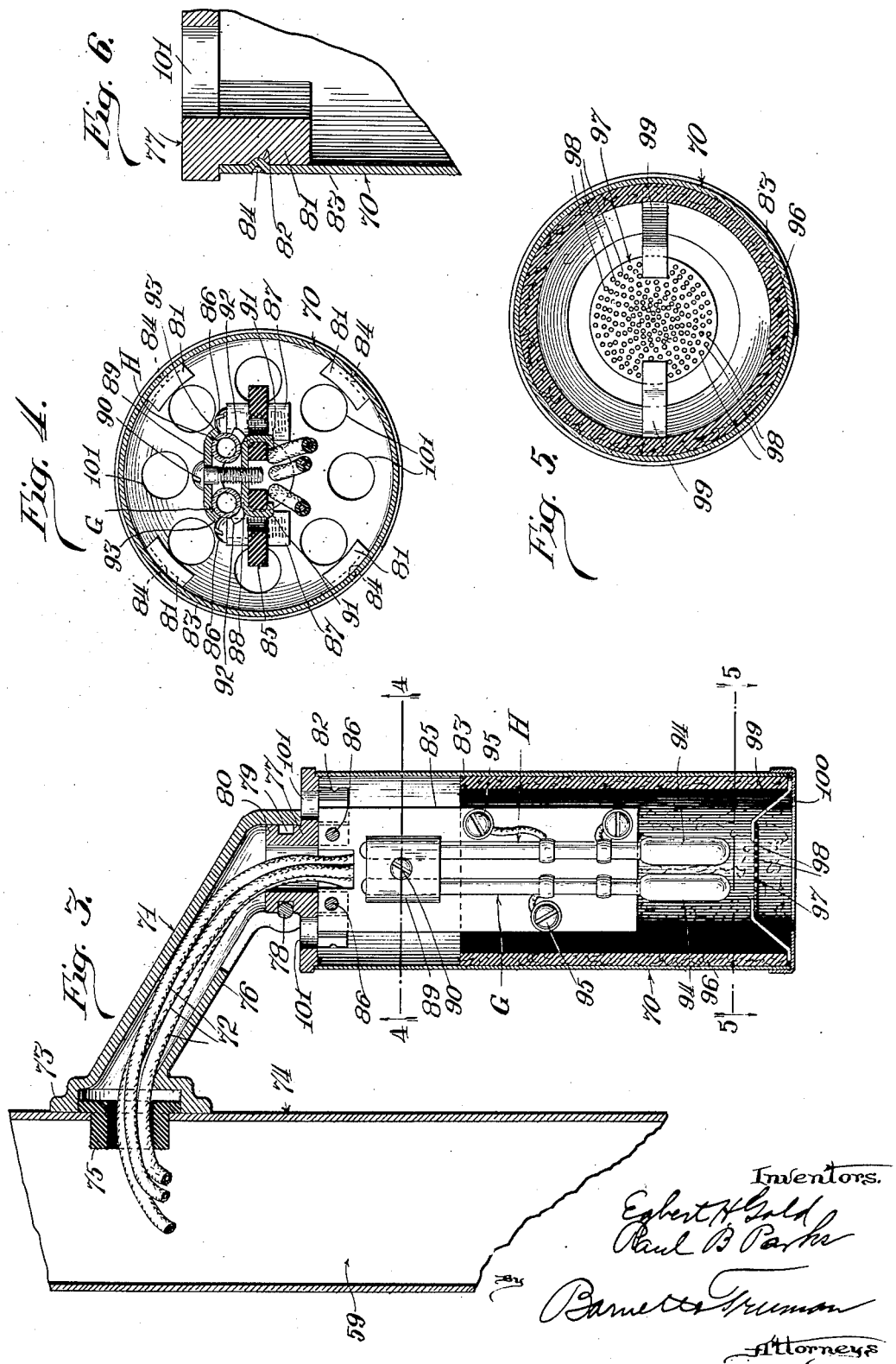

Patented Dec. 22, 1925.

1,566,853

UNITED STATES PATENT OFFICE.

EGBERT H. GOLD, OF CHICAGO, AND PAUL B. PARKS, OF OAK PARK, ILLINOIS, ASSIGNORS TO VAPOR CAR HEATING COMPANY, INC., OF CHICAGO, ILLINOIS, A CORPORATION OF NEW YORK.

THERMOSTAT FOR CAR-HEATING SYSTEMS.

Application filed July 27, 1923. Serial No. 654,216.

*To all whom it may concern:*

Be it known that we, EGBERT H. GOLD and PAUL B. PARKS, citizens of the United States, residing at Chicago and Oak Park, respectively, in the county of Cook and State of Illinois, have invented certain new and useful Improvements in Thermostats for Car-Heating Systems, of which the following is a specification.

Our invention relates to mechanism for automatically controlling the operation of a car heating system, especially a steam heating system in which the inflow of the heating medium to the radiating coil or other radiator is governed by a thermostatic device subject to temperature changes in the car atmosphere; and the principal object of the invention is to so locate, house, protect and arrange the heat sensitive element or elements of the thermostatic device that the device will function reliably and accurately in response to the peculiar and somewhat difficult requirements imposed upon a railway car heating system by the shape and construction of the car, the location of the radiating coils therein and the fact that the car while in service is moved at high speeds.

The invention consists in the new and improved constructions, arrangements and devices to be hereinafter described and claimed for carrying out the above stated object and such other incidental objects as will be referred to in the following description of the preferred embodiment of the invention illustrated in the accompany drawings.

In the drawings,

Fig. 1 is a diagrammatic view of a heating system provided with a thermostatic control responsive to temperature changes in the car atmosphere.

Fig. 2 is a fragmentary, vertical sectional view of the car to illustrate the positions of the thermostat and of the heating coils.

Fig. 3 is a vertical sectional view of the thermostatic device of our invention, the side wall of the car on which the device is supported being shown fragmentarily.

Fig. 4 is a cross sectional view on line 4—4 of Fig. 3, looking in the direction of the arrows.

Fig. 5 is a sectional plan on line 5—5 of Fig. 3, and

Fig. 6 is a detail vertical sectional view of the upper portion of the thermostat housing.

Our invention is illustrated in connection with a heating system such as is disclosed in United States Patent No. 1,440,701 of January 2, 1923 to E. A. Russell in which the car is maintained during periods of service at ordinary room temperature, by means of a "high temperature thermostat"; and when disconnected from the train at a considerably lower temperature, for the purpose of economizing fuel, by means of a "low temperature thermostat". These thermostats are brought into action, to govern the amount of heat delivered to the car, selectively by certain mechanisms which operate automatically. In illustrating the present invention the thermostatic device is shown as provided with two thermostats, one for actuation at high temperature and the other for actuation at low temperature, but it will be understood that so far as this invention is concerned it is equally applicable to a system intended to maintain the car atmosphere at one temperature only and utilizing consequently only one thermostat.

Referring first to Fig. 1 of the drawings, A designates the car radiator, B a steam train pipe from which the radiator is supplied through the pressure reducer or vapor regulator C, and D a four-way valve which in one position of its valve body brings about the circulation of steam through the radiator and back to the thermostat chamber of the vapor regulator, and in the other position closes the inlet and outlet pipes of the radiator and short circuits the steam from the pressure reducing valve of the vapor regulator to the thermostat thereof. E is a motor for operating the valve D, F a limit switch for cutting off current from the motor as soon as the valve movements are completed, G is a high temperature thermostat, H the low temperature thermostat, I a selector switch the position of which determines which thermostat shall control the system, and J a relay short circuited by the closing of the circuit through either one or the other of the thermostats for supplying the two coils of motor E, alternately, with energizing current.

In Fig. 1 the system is shown with the high temperature thermostat G in control but with its circuit open so that the radiator A is receiving steam. In other words, the car is in service with the temperature below the desired temperature, which is ordinarily 70° Fahrenheit. Steam from train pipe B passes through pipe 10 to chamber 11 of valve D and then into chamber 12 of valve D and through the radiating coil A, then through chambers 13 and 14 of valve D and by the return pipe 15 to the thermostat casing 16 of the vapor regulator C. The vapor regulator is a device in common use for controlling inflow to a radiator in response to thermostatic conditions at the outlet of the radiator, which latter is open to the atmosphere, the regulator therefore tending to keep the radiator filled with steam at atmospheric pressure. With the apparatus in the condition noted the armature 17 of relay J is held against an upper pair of contacts 18, 19 through energization of the relay over a circuit as follows:

Circuit No. 1. Battery 20, wire 21, resistance 22, wire 23, coil of the relay J, wire 24 to battery.

As soon as the temperature of the car atmosphere reaches the point at which the high temperature thermostat G is set to operate, 70° Fahrenheit, for example, mercury column 25 of thermostat G reaches contact point 26 closing a circuit through the high temperature thermostat as follows:

Circuit No. 2. Circuit No. 1 to point 27 on wire 23, wire 28, mercury column 25, wire 29 to point 30 on wire 24 and thence to battery.

This deprives relay J of most of its current and the relay armature 17 drops upon contacts 31, 32 closing a circuit through solenoid coil 33 of valve operating motor E as follows:

Circuit No. 3. Wire 21 to point 34 on wire 35, coil 33, wire 36, limit switch contact 37, conducting portion 38 of limit switch F, contact 39, wire 40, contact 31, relay armature 17, contact 32, wire 41 to wire 24, and thence to battery.

The double core member 42 of motor E is moved to the left and through lever 43 the valve body 44 of valve D is turned 90° thereby closing the inlet and outlet ends of radiator A and short circuiting steam from pipe 10 directly to pipe 15. The limit switch, also connected to lever 43, is moved so as to bring the insulated portion 45 between spring contacts 37, 39, breaking circuit No. 3 as soon as the valve movement is completed.

In case the temperature of the car falls below 70° circuit No. 2 will be broken, relay J energized, and the parts of the apparatus restored to the positions which they are shown as occupying in Fig. 1, the right hand coil 46 of motor E being energized through a circuit as follows:

Circuit No. 4. Circuit No. 3 to point 47 on wire 35, coil 46 of motor E, wire 47', spring contact 48 of the limit switch, conducting portion 38' of the limit switch (the switch being now in its right hand position) contact spring 49, wire 50, contact 18, relay armature 17, contact 19, and wires 41 and 24 to the battery.

In order to put the low temperature thermostat H in control of the system, the contact roller 51 of the selector switch I is moved into place between spring contacts 52 and 53 and a circuit provided corresponding to circuit No. 2 for short circuiting the relay J. This circuit closes and opens at a lower temperature than circuit No. 2, for example, at 50° Fahrenheit, so that the high temperature thermostat circuit remains constantly open at the thermostat so long as the low temperature thermostat is in control. The low temperature thermostat circuit is as follows:

Circuit No. 5. Circuit No. 2 to point 54 on wire 28, wire 55, contact spring 52 of selector switch I, roller 51, contact spring 53, wire 56, mercury column 57 of the low temperature thermostat H, wire 58 to wire 29 and by wire 24 to the battery.

It will be observed that in the operation of an automatically controlled system of the type thus described, in order that the system should operate properly, the thermostat must respond promptly to fluctuations in temperature of the car atmosphere. That is to say, if the thermostat is set for 70° (assuming regulation during periods of service) the mechanism should be actuated to shut off the steam from the radiator without too much delay after the actual car temperature reaches 70° and should not act to reopen the radiator until the actual car temperature reaches 70° or nearly that point, otherwise the car will be overheated. If the thermostatic mechanism lags to any very considerable extent, the primary purpose of automatic regulation, namely, the maintenance of a constant temperature in the car, without thought or care on the part of the attendant, will be defeated.

The conditions to which a car heating system is subjected make the use of an ordinary wall thermostat, such as is used for house heating, entirely impractical because of the extent to which such thermostat would be sensitive to thermal influences of an extraneous character. With the ordinary thermostat the heat sensitive element heats and cools as the casing in which it is placed heats and cools, the casing having, therefore, considerable influence upon the action of such heat sensitive element. But in a house heating system this extraneous influence on the heat sensitive element is not very great and is, moreover, so nearly constant as to be a negligible factor. In house heating temperature changes are gradual so that the actuations of the thermostatic mechanism are relatively infrequent.

The heating of a railway car involves a quite different situation. The car is long and narrow with many windows and is moved at a high speed so that the heat lost by conduction through the walls is very great, and this is particularly true of modern railway cars of steel construction. This loss of heat through the walls varies widely dependent upon a number of different factors: The outside temperature, the force and direction of the wind, whether the sun is shining or not, and the position of the wall of the car with respect thereto, whether the car is standing or in motion, and, if in motion, the speed at which it is traveling. Furthermore, the changes in the temperature of a railway car occur much more frequently than the changes in the temperature of the ordinary dwelling house due to the constantly shifting position of the car with reference to sun and wind, and the necessity for making stops, at which times the doors at the ends of the car are likely to be open.

The radiating coils of a railway car are located along the side walls near the floor and the hot air from the pipes rises in a stream of no very great thickness toward the ventilators in the clerestory, the stream bending outwardly to some extent at the windows. From this rising current the heat is diffused through the body of the car but in a way less capable of definition and more subject to variation according to prevailing conditions. In accordance with our invention the thermostat is spaced some distance from the car wall and is enclosed in a tubular housing, open at the bottom and the top, the heat sensitive element or elements, being supported in the middle of the air passage through the housing so as to be out of direct contact with the side wall of the housing. Preferably the support is insulated or formed of heat insulating material and the housing is provided with a heat insulating lining. Preferably the thermostat is located at about the level of the tops of the windows but is placed on or directly above the wall panel between the windows. So located and arranged the thermostat is protected from influence of the cold walls and, to some extent, from the influence of eddy currents and drafts other than that of the main upflowing stream of air. The location of the thermostat is such that the housing intercepts this upflowing stream of air which passes through the housing and in contact with the bulb of the mercury tube, assuming that this type of thermostat is employed, as we deem preferable. In this arrangement the thermostat will respond accurately and quickly to fluctuations in temperature in the car atmosphere as a whole, although in very cold weather a certain difference will exist between the temperatures of the air inside and outside the thermostat housing, as will be hereinafter described, producing a result which is considered desirable.

In Fig. 2, 59 designates the side wall of a railway passenger car, the clere-story of which is indicated at 60. One of the car windows is shown at 61. 70 designates a tubular housing for the thermostat which is secured to the car wall by a bracket 71 at a point somewhat above the level of the windows and in line with one of the panels between adjacent windows. While this is considered as a preferred location conditions may require the thermostat to be placed differently in the car.

The preferred construction of the housing and bracket is shown in Figs. 3, 4, 5 and 6. The bracket 71 is tubular for the leading-in wires 72 and is formed with a flange 73 for riveting to the inner metal sheathing 74 of the side wall structure 59. 75 is an insulating bushing at the wall through which the wires pass. The lower end of the bracket is formed with a slot 76 and the head 77 of the housing is clamped to the bracket by means of a screw 78 which draws the severed parts of the bracket together, the screw passing through a groove 79 in a boss 80 formed on the upper surface of the head. The head is provided with depending lugs 81 formed with grooves 82 and the tubular member 83 of the housing is secured to the lugs 81 by offsets 84 which enter grooves 82.

A supporting plate 85, preferably of insulating material, is secured by screws 86 to lugs 87 on the under side of the head. The high and low temperature thermostats G and H are clamped to plate 85 by clamping plates 88, 89 and a screw 90, plate 88 being formed with tongues 91 extending through openings in the plate 85 and being bent over on the opposite side of the plate and with curved tongues 92 partially embracing the mercury tubes. The edges of the clamping plate 89 are also bent around the tubes as indicated at 93. The bulbs 94 of the thermostats preferably project below the lower edge of the insulating plate 85 which is of non-conducting material so that the binding posts 95 for the electrical conductors may be fixed thereto. 96 is a lining of heat insulating material for the lower portion of the tubular member 83 of the housing, and 97 is a disc formed with a plurality of small perforations 98, which disc is supported within the lower end of the housing by brackets 99 held in place by an angular rim 100 on the tubular member 83. The head 77 at the upper end of the housing is formed with a plurality of openings 101.

The purpose of the disc 97, which is arranged quite close to the ends of the thermostat bulbs, is to produce an appreciable difference between the operating temperature of the thermostat and the car temperature, a difference, for example, of two degrees, in very cold weather. When the outside temperature is very low in comparison with the car temperature the side wall of the car will be cold and as a result there will be a leakage of heat from disc 97 through brackets 99 and through the wall of the housing and its supporting bracket. The air entering the thermostat casing is therefore robbed of a certain amount of its heat so that, assuming that the thermostat is set for actuation at 70°, the mercury column will not make contact to close the thermostat circuit until the atmosphere of the car has reached a temperature of 72°. This difference in temperature may be varied by increasing or decreasing the openings in disc 97 and by positioning the disc nearer to or farther from the thermostat bulb. In very severe weather it is desirable to maintain a temperature in the neighborhood of the thermostat somewhat above normal temperature in order to be more certain of keeping the rest of the car comfortably warm since with a low outside temperature the proportion between temperatures at the ends and middle of the cars is greater than for higher outside temperatures. In mild winter weather, or with the sun shining on the car, there is less difference between the temperature of the atmosphere within the car and the car wall. Under these conditions the disc 97 does not appreciably affect the situation. The thermostat will be actuated at approximately the temperature of the air in the part of the car surrounding the thermostat casing.

While we have described our invention in a preferred embodiment, it is realized that considerable modification might be made in the structural form and arrangement of the apparatus. We therefore desire to be understood as intending to cover all the modifications within the scope of the appended claims.

We claim:

1. In combination with a railway car, a radiator therein, a thermostat inside the car for controlling the circulation of heating medium through the radiator, a housing having an air passage therethrough, and a support for the thermostat in said air passage composed of heat insulating material.

2. In combination with a railway car, a radiator therein, a thermostat remote from the radiator and adapted to control the circulation of heating medium through the radiator, a housing having an air passage therethrough, a lining of heat insulating material, and means for supporting the thermostat in said air passage spaced from the housing wall.

3. In combination with a railway car, a radiator therein, a thermostat remote from the radiator and adapted to control the circulation of heating medium through the radiator, a housing having an air passage therethrough, a lining of heat insulating material, and a support for the thermostat of heat insulating material arranged in said air passage and spaced from the wall of the housing.

4. In combination with a railway car, a radiator therein, a thermostat remote from the radiator for controlling the circulation of heating medium through the radiator, and a tubular housing open at the top and bottom for the passage of air therethrough and provided with a heat insulating lining in which housing the thermostat is located.

5. In combination with a railway car, a radiator therein, a thermostat within the car and spaced from the wall thereof for controlling the circulation of heating medium through the radiator, a tubular housing open at the top and bottom for passage of air therethrough, and a support for the thermostat in said housing and spaced from the wall thereof.

6. In combination with a railway car, a radiator therein, a thermostat for controlling the circulation of heating medium through the radiator, a tubular housing open at the top and bottom for passage of air therethrough, and a support for the thermostat in said housing and spaced from the wall thereof which is composed of heat insulating material.

7. In combination with a railway car, a radiator therein, a thermostat for controlling the circulation of heating medium through the radiator, a housing for the thermostat open at top and bottom only, and a bracket for supporting the housing spaced from the wall of the car so that a free air space remains between the car wall and the closed side of the housing.

8. In combination with a railway car, a radiator therein, a thermostat for controlling the circulation of heating medium through the radiator, a housing for the thermostat, a bracket for supporting the housing spaced from the wall of the car, and means for supporting the thermostat in the housing spaced from the wall thereof.

9. In combination with a railway car, a radiator therein, a thermostat remote from the radiator for controlling the circulation of heating medium through the radiator, a housing for the thermostat, and a heat insulating lining in said housing.

10. In combination with a railway car, a radiator therein, a thermostat for controlling the circulation of heating medium through the radiator, a housing for the thermostat, a heat insulating lining in said housing, and a heat insulating support within the housing for the thermostat.

11. In combination with a railway car, a radiator therein, a thermostat for controlling the circulation of heating medium through the radiator, a tubular housing open at its ends, a bracket for supporting the housing spaced from the car wall, and means for supporting the thermostat within and spaced from the wall of the housing.

12. In combination with a railway car, a radiator therein, mechanism for controlling the circulation of heating medium through the radiator comprising a circuit making and breaking thermostat, and conductors leading therefrom, a tubular housing for the thermostat, and a bracket for spacing the housing from the car wall which is hollow for receiving the thermostat conductors.

13. In combination with a railway car, a radiator therein, mechanism for controlling the circulation of the heating medium through the radiator comprising a circuit making and breaking mercury tube thermostat, and conductors leading therefrom, a tubular housing in the space in which the mercury tube is suspended, and a bracket for spacing the housing from the car wall which is hollow for receiving the thermostat conductors.

14. In combination with a railway car, a radiator therein, mechanism for controlling the circulation of heating medium through the radiator comprising a circuit making and breaking mercury tube thermostat, a tubular housing supported on but spaced from the car wall and open at its upper and lower ends, a plate arranged centrally within the housing and spaced from the walls thereof, and means for supporting the mercury tube on said plate.

15. In combination with a railway car, a radiator therein, mechanism for controlling the circulation of heating medium through the radiator comprising a circuit making and breaking mercury tube thermostat, a tubular housing supported on the car wall and open at its upper and lower ends, a heat insulating lining for said housing, a plate arranged within the housing, and means for supporting the mercury tube on said plate.

16. In combination with a railway car, a radiator therein, mechanism for controlling the circulation of heating medium through the radiator comprising a circuit making and breaking mercury tube thermostat, a tubular housing supported on the car wall and open at its upper and lower ends, a plate of heat insulating material arranged within the housing and secured thereto at one end only, and means for supporting the mercury tube on said plate.

17. In combination with a railway car, a radiator therein, mechanism for controlling the circulation of heating medium through the radiator comprising a circuit making and breaking mercury tube thermostat, a tubular housing supported on the car wall and open at its ends, a heat insulating lining in the housing, a plate of heat insulating material arranged within the housing and secured thereto at one end only, and means for supporting the mercury tube on said plate.

18. In combination with a railway car, a radiator therein, mechanism for controlling the circulation of heating medium through the radiator comprising a circuit making and breaking mercury tube thermostat, a tubular housing supported on the car wall and open at its upper and lower ends, a plate on which the thermostat is mounted arranged within the housing out of contact with the side wall thereof, and a perforated disc at the bottom of the housing secured to the wall thereof and directly below the bulb of the mercury tube 19. In combination with a railway car, a radiator therein, a thermostat for controlling the circulation of heating medium through the radiator, a metallic housing surrounding the thermostat, a bracket for supporting said housing on the car wall, and a screening device for reducing the temperature of the air entering the housing by leakage of heat through the housing and bracket to the car wall.

20. A thermostatic device comprising, in combination, a tubular housing member having a head formed with air outlets at its upper end, a bracket engaging said head for supporting the housing, a plate and heat insulating material secured to the under side of the head so as to project through the tubular housing spaced from the side wall thereof, a mercury tube thermostat secured to said plate, and a perforated disc supported within the lower end of the tubular housing directly below said mercury tube.

21. In combination with a railway car, a radiator therein, a thermostat for controlling the circulation of heating medium through the radiator mounted within the car at a position remote from the radiator, means for supporting the thermostat from the car wall but spaced therefrom, and means for shielding the thermostat from the influence of the air currents adjacent the car wall.

22. In combination with a railway car, a radiator therein, a thermostat for controlling the circulation of heating medium through the radiator mounted within the car at a position remote from the radiator, means for supporting the thermostat from the car wall but spaced therefrom, and means for insulating the thermostat from the air currents which flow along the car wall.

23. In combination with a railway car, a radiator therein, a thermostat for controlling the circulation of heating medium through the radiator mounted within the car at a position remote from the radiator, a housing having an air passage therethrough, means for supporting the thermostat in the air passage, and means for supporting the housing from the car wall, but spaced therefrom so that a free air space remains completely around the housing.

24. In combination with a railway car, a radiator therein, a thermostat for controlling the circulation of heating medium through the radiator mounted within the car at a position remote from the radiator, a substantially tubular housing with openings at the ends to provide an air passage therethrough, a bracket for supporting the housing in substantially vertical position and spaced from one of the side walls of the car, and means for supporting the thermostat within the air passage in the housing, whereby the thermostat is protected from air currents flowing longitudinally of the car, and from currents flowing up along the car wall, but will be controlled by normal rising air currents in the interior of the car.

25. In combination with a thermostat for controlling the circulation of heating medium through a radiator in a railway car, means for mounting the thermostat in the car comprising a housing having an air passage therethrough, means for supporting the housing from a car wall but with the walls of the housing spaced from the car wall whereby an unimpeded air passage remains between the walls of the car and the housing, and means for supporting the thermostat in the air passage.

26. In combination with a thermostat for controlling the circulation of heating medium through a radiator in a railway car, means for mounting the thermostat in the car comprising a housing having an air passage therethrough, means for supporting the housing from a car wall but with the walls of the housing spaced from the car wall, and means for supporting the thermostat in the air passage but spaced from the walls of the housing.

27. In combination with a thermostat for controlling the circulation of heating medium through a radiator in a railway car, means for mounting the thermostat in the car comprising a tubular housing with open ends to provide an air passage therethrough, a bracket for supporting the housing from a car wall, and spaced therefrom to provide a free air space completely around the housing, and means for supporting the thermostat in the air passage in the housing and spaced from the walls of the housing.

28. In combination with a railway car, a radiator therein, a thermostat for controlling the circulation of heating medium through the radiator mounted within the car at a position remote from the radiator, a housing open at its upper and lower ends only, in which the thermostat is enclosed, and means for supporting the housing and thermostat whereby they are entirely separated from the nearest car wall so that a completely uninterrupted air space exists around the housing.

29. In combination with a railway car, a radiator therein, a thermostat for controlling the circulation of heating medium through the radiator mounted within the car at a position remote from the radiator, a housing open at its upper and lower ends only, in which the thermostat is enclosed, and a bracket projecting outwardly and downwardly from the car wall to support the thermostat and housing, whereby an entirely uninterrupted air space exists between the housing and the adjacent wall of the car.

30. In a car heating system, a mounting for a thermostat comprising a housing open at its upper and lower ends only, to provide an air passage therethrough, means for supporting the thermostat within the air passage, and a bracket projecting upwardly and laterally from the top of the housing to support the housing from the wall of a railway car but entirely out of contact therewith.

31. In combination with a railway car, a radiator therein, a thermostat for controlling the circulation of heating medium through the radiator mounted within the car at a position remote from the radiator, a substantially tubular housing with openings at the ends to provide an air passage therethrough, a bracket for supporting the housing in substantially vertical position and spaced from one of the side walls of the car, means for supporting the thermostat within the air passage in the housing, whereby the thermostat is protected from air currents flowing longitudinally of the car, and from currents flowing up along the car wall, but will be controlled by normal rising air currents in the interior of the car and means arranged in the path of the air flowing into the housing for reducing its temperature so as to effect a lag in the operation of the thermostat.

32. In combination with a railway car, a radiator therein, a thermostat for controlling the circulation of heating medium through the radiator mounted within the car at a position remote from the radiator, a substantially tubular housing with openings at the ends to provide an air passage therethrough, a bracket for supporting the housing in substantially vertical position and spaced from one of the side walls of the car, means for supporting the thermostat within the air passage in the housing, whereby the thermostat is protected from air currents flowing longitudinally of the car, and from currents flowing up along the car wall, but will be controlled by normal rising air currents in the interior of the car and a perforated heat absorbing element arranged in the path of the air flowing into the housing to effect a lag in the operation of the thermostat.

33. In combination with a railway car, a radiator therein, a thermostat for controlling the circulation of a heating medium through the radiator mounted within the car at a position remote from the radiator, a substantially tubular housing with openings at the ends to provide an air passage therethrough, a bracket for supporting the housing in substantially vertical position and spaced from one of the side walls of the car, means for supporting the thermostat within the air passage in the housing, whereby the thermostat is protected from air currents flowing longitudinally of the car, and from currents flowing up along the car wall, but will be controlled by normal rising air currents in the interior of the car and means for withdrawing heat from the air entering the housing so as to effect a lag in the operation of the thermostat.

EGBERT H. GOLD.
PAUL B. PARKS.